(12) United States Patent
Styron et al.

(10) Patent No.: US 6,242,098 B1
(45) Date of Patent: *Jun. 5, 2001

(54) METHOD OF MAKING MINERAL FILLER AND POZZOLAN PRODUCT FROM FLY ASH

(75) Inventors: Robert William Styron, Marietta; Kamal Seyi Abiodun, College Park, both of GA (US)

(73) Assignee: Mineral Resources Technologies, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/357,046

(22) Filed: Jul. 19, 1999

Related U.S. Application Data

(63) Continuation-in-part of application No. 09/251,515, filed on Feb. 17, 1999, now Pat. No. 6,139,960.

(51) Int. Cl.$^7$ ................ B32B 5/16; B03B 1/02; C04B 14/04; C09C 1/28

(52) U.S. Cl. ............... 428/402; 106/405; 106/461; 106/466; 106/481; 106/483; 106/484; 106/DIG. 1; 209/2; 209/11; 428/403

(58) Field of Search .................... 428/402, 403; 106/405, 461, 466, 481, 483, 484, DIG. 1; 209/2, 11

(56) References Cited

U.S. PATENT DOCUMENTS

| | | |
|---|---|---|
| 3,769,053 | 10/1973 | Pennachetti et al. . |
| 3,769,054 | 10/1973 | Pennachetti et al. . |
| 3,991,005 | 11/1976 | Wallace ................. 260/38 |
| 4,013,616 | 3/1977 | Wallace ............ 260/42.46 |
| 4,121,945 | 10/1978 | Hurst et al. . |
| 4,294,750 | 10/1981 | Klingaman et al. ..... 260/40 R |
| 4,661,533 | 4/1987 | Stobby ................. 521/122 |
| 5,302,634 | 4/1994 | Mushovic ............. 523/219 |
| 5,391,417 | 2/1995 | Pike . |
| 5,565,239 | 10/1996 | Pike . |
| 5,814,256 | 9/1998 | Greve et al. ............. 264/86 |
| 5,849,075 | 12/1998 | Hopkins et al. . |
| 6,139,960 | * 10/2000 | Styron et al. ......... 428/402 |

FOREIGN PATENT DOCUMENTS

| | | |
|---|---|---|
| 292 008 | 7/1991 | (DE) . |
| 0 103 175 | 3/1984 | (EP) . |
| WO 97/21640 | 6/1997 | (WO) . |

OTHER PUBLICATIONS

Jarvela et al., "Multicomponent compounding of polypropylene", Article from publication © 1996 Chappman & Hall, pp. 3853–3860.

Wong & Truss, "Effect of Flyash Content and Coupling Agent on the Mechanical Properties of Flyash–Filled Polypropylene", *Composites Science & Technology*, 1994, pp. 361–368.

Article entitled "Research News", *Journal of Protective Coatings & Linings*, Jun. 1988, pp. 4–9.

Perkov, A.N., "Production of Filler for Manufacture of Industrial Rubber Products from Thermal–Power Plant Ash", Khimiya Tverdogo Topoiva, vol. 26, No. 6, 1992, pp. 80–86.

(List continued on next page.)

Primary Examiner—Hoa T. Le
(74) Attorney, Agent, or Firm—Killworth, Gottman, Hagan & Schaeff, L.L.P.

(57) ABSTRACT

A method for producing a mineral filler and pozzolan product from fly ash is provided in which fly ash is dry processed in an air classifier to obtain a fine fraction having an average particle size of from about 0.1 to 5 microns and a coarse fraction having an average particle size of from about 6 to 20 microns. The fine fraction is then preferably passed through a magnetic separator to remove ferrous iron oxides and may optionally be treated with a surface modifier to form a mineral filler. The coarse fraction is preferably passed through a 100 mesh screen to form a pozzolan product.

15 Claims, 1 Drawing Sheet

OTHER PUBLICATIONS

Pashchenko et al., "Fly Ash of heat and electric power plants and ferrochromium slag as fillers for plastics" (Abstract); *Plastics Manufacture & Processing,* 1984.

Huang et al., "Processed Low $No_x$ Fly Ash as a Filler in Plastics", Proceedings of Twelfth International Symposium on Management & Use of Coal Combustion Byproducts (CCBs), Jan. 26–30, 1997, Orlando, Florida, USA.

Abstract: Khytsnar, Y., et al.; "Fly Ash: A Filler for Plastics", Publication Date: 1987, pp. 42–43.

Chamberlain et al., "The Viability of Using Fly Ash as a Polymer Filler", ANTEC '98, pp. 3415–3417.

Gerasimova, et al., "Pigments and Fillers Prepared from the Ash of Thermal Power Plants", *Russian Journal of Applied Chemistry,* vol. 71, No. 5, 1998, pp. 771–774.

Yang and Hlavacek, "Improvement of PVC wearability by addition of additives", *Powder Technology,* 1999, pp. 182–188.

Sole and Ball, On the abrasive wear behavior of mineral filled polypropylene, from Tribology International, vol. 29, No. 6, 1996, pp. 457–465.

Berry, et al., "Investigation of some new spherical fillers", *Plastics Compounding,* Nov./Dec. 1986, pp. 12–22.

Curtis, et al.; "Coal Ash as an Alternative Filler and Colorant in Plastics", ANTEC '95, pp. 3594–3598.

"Fly ash shows promise as plastics filler" C&EN, May 8, 1978, pp. 29–300.

Roger L. Kaas, "Residual Fly Ash Can Replace Talc and Kaolin as Polypropylene Filler" Plastics Design & Processing, Nov. 1978, pp. 49–53.

G.J. Jablonski, "Fly Ash Utilization as an Extender in Plastics and Paints" International Ash Utilization Symposium, Oct. 1987, pp. 38.1–38.15.

Advertisement for "Quality Polyolefine Pipes demand quality Packaging!" Modern Plastics International, Oct. 1986, p. 19.

Yih et al., "Recovery of Cenospheres and Application to the Manufacture of Insulation Materials" Journal Of the Chin. I. Ch. E., vol. 19, No. 1, 1988, pp. 23–29.

G. Dinelli, "Thermal By–Products Treatment and Valorization" Chemicke Listy, vol. 89, No. 3, Mar. 1995, pp. 137–143.

Borrachero, P.J. et al., "Improvement of Portland cement/fly ash mortars strength using classified fly ashes" Proceedings of the International Conference on Environmental Implications of Construction with Waste Materials, vol. 2, 1994, pp. 563–570.

Ukita, K. et al., Properties of High Strength Concrete Using "Classified Fly Ash" 4th International Conference on Fly Ash, Silica Fume, Slag and Natural Pozzolans in Concrete, May, 1992, pp. 37–47.

* cited by examiner

METHOD OF MAKING MINERAL FILLER AND POZZOLAN PRODUCT FROM FLY ASH

CROSS-REFERENCE TO RELATED APPLICATIONS

This application is a continuation-in-part of U.S. application Ser. No. 09/251,515 filed Feb. 17, 1999, now U.S. Pat. No. 6,139,960.

BACKGROUND OF THE INVENTION

This invention relates to a method of making an industrial mineral filler and a pozzolan product from fly ash, and more particularly, to a method in which raw fly ash is dry processed into fine and coarse fractions which can be utilized as mineral filler and pozzolan products.

Fly ash is a by-product derived from the combustion of coal and comprises finely divided inorganic products. Enormous amounts of fly ash are produced annually nationwide, primarily from burning coal in electric power plants. Disposal of fly ash has posed an increasingly difficult problem because the volume, the particulate nature, and the varied chemical composition of fly ash limit the number of acceptable disposal sites.

Accordingly, efforts have been made to find alternative, economic uses for fly ash. For example, fly ash has been used as a pozzolan material in concrete applications. However, the direct use of fly ash as a pozzolan product has been limited as the high carbon content in the fly ash prevents entrainment of the concrete, causing non-uniform hardening. In order for larger amounts of fly ash to be suitable for use as a pozzolan product, the fly ash should have a low carbon content.

Another potential use for fly ash is as an industrial mineral filler. Mineral fillers are widely used in plastic products to improve performance and reduce costs. Mineral fillers commonly used for applications such as plastics, compounding, injection molding, paper products and the like include calcium carbonate, kaolin, aluminum hydrate, mica, talc and ground silica. The chemistry and characteristics of fly ash are close to those of such commercial fillers and would be a desirable substitute. However, the particle size of fly ash is much larger than that of typical commercial fillers. Wet processing such as wet milling, froth flotation, attrition grinding, and wet magnetic iron removal have been used in the past to reduce and control the particle size of fly ash. However, such methods are complicated, expensive, and require a multi-step process as the wet fly ash must be oven dried. In addition, methods such as froth flotation utilize reagents such as turpentine which must be safely disposed of.

Accordingly, there is still a need in the art for a method for producing useful products from fly ash such as mineral filler and pozzolan which method is economical and easy to implement.

SUMMARY OF THE INVENTION

The present invention meets that need by providing a method of processing fly ash into mineral filler and pozzolan products which utilizes fly ash having a low carbon content and which utilizes a dry method of processing, i.e., the method does not require or involve wetting, drying, or rewetting of the fly ash during processing. The resulting filler has an average particle size of from about 0.1 to 5 microns and may be used in a number of filler applications including plastics, paint, rubber, putty insecticides, textile coatings, putty, sealants, paper, calking, rubber, asphalt, and tiles. The enhanced pozzolan has an average particle size of less than about 10–20 microns and may be used in the manufacture and replacement of cement, as well as in soil stabilization.

In accordance with one aspect of the invention, a method for producing mineral filler from fly ash is provided comprising the steps of providing a quantity of raw fly ash having a carbon content of about 0.1 to 40% by weight, and passing the fly ash through an air classifier to obtain from about 0.1% to about 65% by weight of a fine fraction having an average particle size of from about 0.1 to about 5 microns. The method preferably includes the step of passing the fine fraction obtained through a magnetic separator to remove from about 0.1 to 99% by weight ferrous iron oxide from the fine fraction.

Preferably, the method further includes the step of treating or coating the filler with a surface modifier such as a surfactant, coupling agent, lubricant, or acid scavenger. The surface modifier is preferably selected from the group consisting of silanes, stearates, aluminate, titanate, and zirconate. A preferred silane is vinyl-amino methoxyl siloxane. A preferred stearate is calcium stearate. A preferred titanate is amino titanate. The surface modifier is preferably applied at a dry coating weight of between about 0.1 to 5% by weight.

The resulting filler may be used in a number of filler or extender applications as well as in composites. Specific uses for the fillers include thermoplastic compounding of polypropylene, low and high density polyethylene molds and extrusions, and in thermosetting bulk molding, compounding and reinforced injection molding of unsaturated polyesters and polystyrenes. The filler may also be used in the thermoforming compounding of rigid or flexible polyvinyl chloride.

A method for producing an improved pozzolan product from fly ash is also provided which comprises the steps of providing a quantity of raw fly ash having a carbon content of about 0.1 to 40% by weight, and passing the fly ash through an air classifier to obtain from about 35 to 95% by weight of a coarse fraction. The method preferably further includes the step of passing the coarse fraction through a 100 mesh screen. The resulting pozzolan product exhibits a compressive strength of at least 3000 psi for 28 days and provides provides uniform hydration when used in cement manufacture or replacement applications.

While the methods for forming a mineral filler and pozzolan product have been described herein as separate methods, it should be appreciated that both the mineral filler and pozzolan product may be produced from fly ash in a single process. Such a process comprises the steps of providing a quantity of fly ash having a carbon content of about 0.1 to 40% by weight; and passing the fly ash through an air classifier to obtain from about 35 to 95% by weight of a coarse fraction and from about 5 to 65% by weight of a fine fraction. The fine fraction obtained is then preferably passed through a magnetic separator to obtain the mineral filler, and the coarse fraction is preferably passed through a 100 mesh screen obtain the pozzolan product.

Accordingly, it is a feature of the present invention to provide a method for forming mineral filler and pozzolan products from fly ash. Other features and advantages of the invention will be apparent from the following description, the accompanying drawings, and the appended claims.

DETAILED DESCRIPTION OF THE PREFERRED EMBODIMENT

Figure 1:
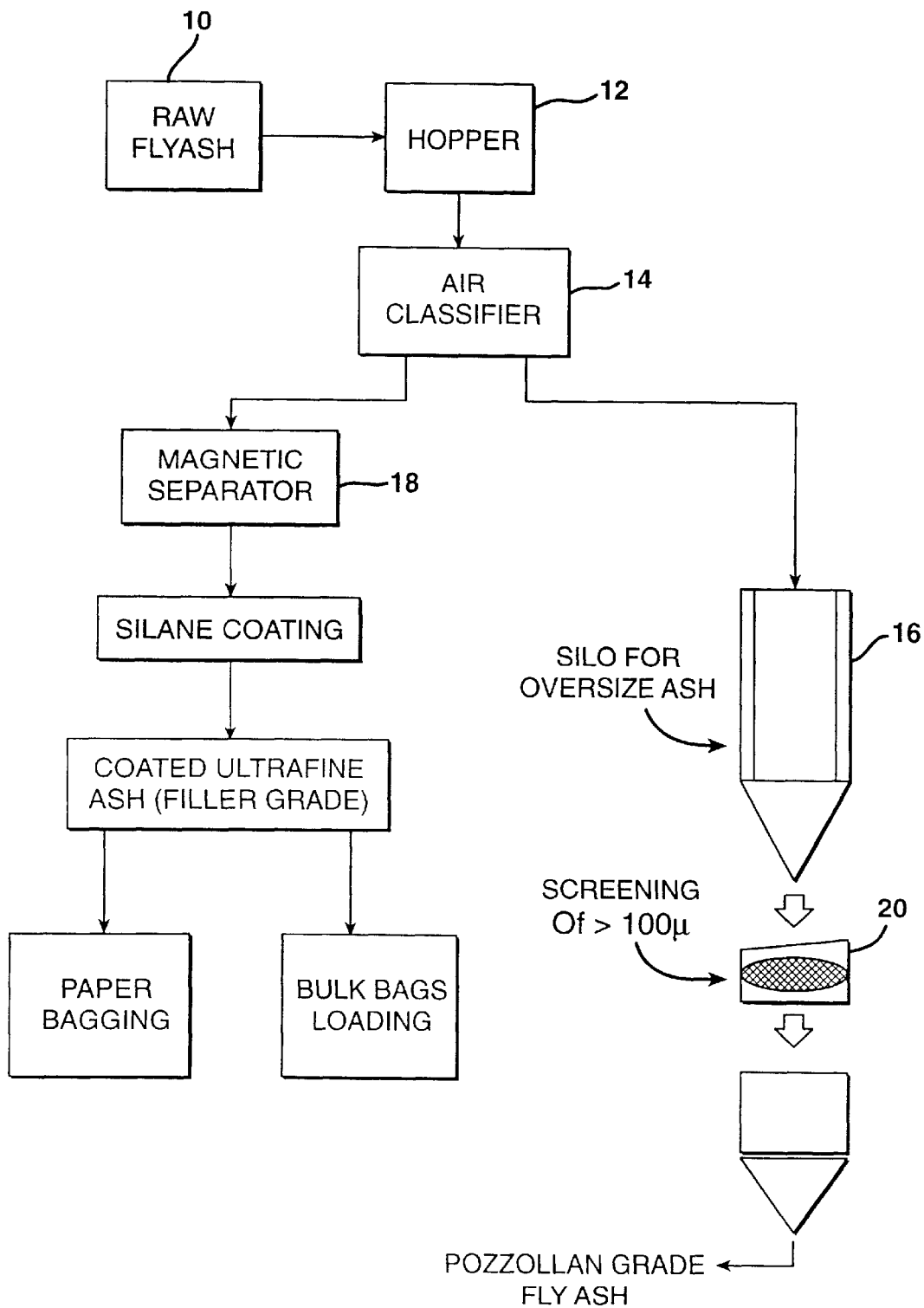
FIG. 1 is a flow diagram illustrating the method of making the filler and pozzolan products of the present invention.

The method of the present invention provides several advantages over previous processes in that it utilizes a dry processing method which does not require wetting and drying of the fly ash, and thus requires fewer steps and is more economical. The process is applicable to both Class C and Class F fly ash, which have a typical particle size distribution of about 0 to 150 microns, and an average particle size of about 10 to 15 microns. In addition, the method of the present invention utilizes fly ash having a minimal carbon content which results in improved properties for the resulting filler and pozzolan.

Referring now to FIG. 1, the method of the present invention is illustrated. As shown, raw fly ash 10 having a carbon content of about 0.1 to 40% by weight, and more preferably, about 0.1 to 4% by weight, is fed into a hopper 12 and then through an air classifier 14 which separates the fly ash into a fine fraction having an average particle size of from about 0.1 to about 5 microns and a coarse fraction having an average particle size of about 6 to 20 microns. A preferred air classifier for use in the present invention is a Raymond® High Performance Jet-Stream™ Classifier available from ABB Raymond. Also suitable for use is a Raymond® mechanical air separator.

The coarse fraction of the fly ash generated from the air classifier is preferably diverted to a silo 16, and is then preferably passed through a 100 mesh screen 20 which removes oversize particles of silica or carbon contained in the fly ash which could impair the quality of the fly ash and its cementations properties. The typical chemical composition of the resulting pozzolan is about 0.1 to 60% by weight aluminum oxide, about 0.5 to 50% by weight calcium oxide, about 0.5 to 50% by weight silicon oxide, about 0.5 to 10% by weight magnesium oxide, about 0.1 to 5% by weight titanium dioxide, about 0.1 to 10% by weight iron, and about 0.1 to 10% by weight sulfur trioxide. Trace amounts of other compounds may also be present.

The fine fraction generated from the air classifier is preferably passed through a magnetic separator 18 to remove from about 0.1 to 99% by weight ferrous iron oxides, or magnetic iron, from the fine fraction. Suitable magnetic separators suitable for use include the Pernroll® Magnetic Separator available from OSNA Equipment Inc., and Carpco and Ereiz Magnetic Units, available from Ereiz Magnets Inc. Preferred separators include an NHI (Neodymium-Iron-Boron) magnet, available from Bunting Magnetics Co. and a magnetic separator available from Walker Magnetics. After removal of ferrous iron oxides, the filler is preferably treated with a surface modifier, such as an acid scavenger, surfactant, coupling agent, or lubricant to allow for higher loading and better coupling with polymers with little or no viscosity change. Such surface modifiers function to enhance the bond between the filler and the polymer or other medium in which the filler used. Suitable surface modifiers or coating agents include silanes, stearates, aluminates, titanates, and zirconates. Preferred surface modifiers are silanes and stearates, which may be used in aqueous, solid, or pre-hydrolyzed forms. A preferred silane is vinyl-amino methoxyl siloxane, which is a 40% solids solution of silane in methanol solvent available from Dow Corning. The silane is preferably surface coated as an aqueous solution on the filler particles using conventional spraying equipment. A preferred stearate is calcium stearate regular which is available from Witco Corporation in solid form. The stearate may be applied by several methods. For example, the filler may be dissolved with calcium stearate in water and then oven dried. Alternatively, the calcium stearate may be applied as a surface treatment while milling with the filler. The preferred method is to spray the calcium stearate on the filler while flowing the filler through a pug mill mixer or a paddle mill mixer.

The surface modifier may be applied to the filler prior to or during compounding with the polymer or other medium. The treated filler may then be bagged or otherwise packaged for shipment to a customer. The filler may also be mixed with water (slurried) for tank shipment for use in paint and paper applications.

The typical chemical composition of the filler includes from about 5 to 60% by weight aluminum oxide, about 0.5 to 60% by weight calcium oxide, about 5 to 30% by weight silicon oxide, about 0.5 to 15% by weight magnesium oxide and about 0.1 to 10% by weight titanium dioxide. More preferably, the chemical composition includes about 25 to 45% by weight aluminum oxide, about 30 to 40% calcium oxide, about 15 to 25% silicon oxide, about 0.5 to 10% magnesium oxide, and about 0.1 to 5% titanium dioxide.

The filler is comprised of spherical particles which allows better throughput and compounding when used. The filler also coats and tints easily and disperses uniformly. The filler has an oil absorption of about 22/100 according to ASTM D281, and a specific heat of 0.24 according to ASTM 4611. The filler exhibits a pH in water of from about 6 to 8 (ASTM 4972), thermal stability at temperatures up to about 1000 to 2500° F., a specific gravity of about 2.5 to 3.1 and Mohs hardness of about 3 to 5.5.

In order that the invention may be more readily understood, reference is made to the following examples which are intended to illustrate the invention, but not limit the scope thereof

EXAMPLE 1

Four samples of fly ash, A, B, C and D were provided. The principles constituents (by weight percent) of Samples A, B and C as received are illustrated in Table 1. Each sample had a carbon content in the range of 0.37 to 0.40% and accordingly a very low LOI as indicated. Samples A, B and C were then separated by air classification at varying degrees (RPM) according to the method of the present invention. Sample D remained in the form of untreated raw fly ash. Laboratory batch mixes were then prepared by adding respective Samples A, B and C to portland cement at a ratio of 1:4. Concrete slump was maintained between 4–4¾ for all four mixes.

Table 1 below illustrates the principal constituents (by weight percent) of samples A, B, and C as received.

TABLE 1

| Component | Sample A (wt. %) | Sample B (wt. %) | Sample C (wt. %) |
| --- | --- | --- | --- |
| Moisture | 0.04 | 0.04 | 0.05 |
| LOI | 0.17 | 0.19 | 0.24 |
| $SiO_2$ | 42.13 | 45.86 | 42.02 |
| $Al_2O_3$ | 17.37 | 17.07 | 17.52 |
| $Fe_2O_3$ | 5.79 | 5.74 | 5.59 |
| $SO_3$ | 0.99 | 0.80 | 0.95 |
| CaO | 23.23 | 21.01 | 23.28 |
| MgO | 4.55 | 4.09 | 4.70 |
| $Na_2O$ | 1.45 | 1.29 | 1.41 |
| $K_2O$ | 0.36 | 0.34 | 0.37 |
| $P_2O_5$ | 0.94 | 0.90 | 0.97 |
| $TiO_2$ | 1.45 | 1.42 | 1.44 |

TABLE 1-continued

| Component | Sample A (wt. %) | Sample B (wt. %) | Sample C (wt. %) |
|---|---|---|---|
| SrO | 0.32 | 0.30 | 0.32 |
| BaO | 0.63 | 0.61 | 0.64 |

Table 2 illustrates the compressive strengths (psi) of the samples after 3, 7, 14 and 28 days.

TABLE 2

| Days | | Sample A 1–2 microns removed (~12 microns) | Sample B 2–3 microns removed (~15 microns) | Sample C 3–5 microns removed (~20 microns) | Sample D Raw ~10 microns |
|---|---|---|---|---|---|
| 3 Days | #1 | 1968 | 1356 | 1343 | 1560 |
| | #2 | 1895 | 1456 | 1433 | 1618 |
| Average | | 1930 | 1410 | 1390 | 1590 |
| 7 Days | #1 | 2868 | 2274 | 2104 | 2859 |
| | #2 | 2513 | 2212 | 2170 | 2897 |
| Average | | 2690 | 2240 | 2140 | 2870 |
| 14 Days | #1 | 3651 | 2561 | 2502 | 3848 |
| | #2 | 3506 | 2678 | 2694 | 3508 |
| Average | | 3580 | 2620 | 3850 | 3680 |
| 28 Days | #1 | 4294 | 3274 | 3451 | 4278 |
| | #2 | 4126 | 3251 | 3329 | 4398 |
| Average | | 4210 | 3260 | 3390 | 4340 |

All of the fly ashes passed the mandatory>3,000 psi @ 28 days required of all concrete mixes. It should also be noted that the oversize of the 1 micron particle size (Sample A) exhibited a higher 3-day strength than the raw ash.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of producing mineral filler from fly ash comprising the steps of:
   providing a quantity of raw fly ash having a carbon content of about 0.1 to 40%; and
   passing said fly ash through an air classifier to obtain from about 0.1% to about 60% by weight of a fine fraction having an average particle size of from about 0.1 to about 5 microns.

2. The method of claim 1 further including the step of passing said fine fraction through a magnetic separator to remove ferrous iron oxide from said fine fraction.

3. The method of claim 1 further including the step of treating said fine fraction with a surface modifier.

4. The method of claim 3 wherein said surface modifier is selected from the group consisting of silanes, stearates, aluminates, titanates, and zirconates.

5. The method of claim 4 wherein said surface modifier comprises a vinyl-amino methoxyl silane.

6. The method of claim 4 wherein said surface modifier comprises calcium stearate.

7. The method of claim 4 wherein said surface modifier comprises amino titanate.

8. The method of claim 3 wherein said surface modifier is applied at a dry coating weight of between about 0.1 to 5% by weight.

9. The method of claim 1 in which said mineral filler comprises from about 5 to 60% by weight aluminum oxide, from about 0.5 to 60% by weight calcium oxide, from about 5 to 30% by weight silicon oxide, from about 0.5 to 15% by weight magnesium oxide and from about 0.1 to 10% by weight titanium dioxide.

10. The method of claim 1 wherein said raw fly ash has a carbon content of about 0.1 to 4% by weight.

11. A method for producing a pozzolan product from fly ash comprising the step of:
   providing a quantity of raw fly ash having a carbon content of about 0.1 to 40% by weight;
   passing said fly ash through an air classifier to obtain from about 35 to 95% by weight of a coarse fraction.

12. The method of claim 11 further including the step of passing said coarse fraction through a 100 mesh screen.

13. The method of claim 11 wherein said pozzolan product has a compressive strength of at least 3000 psi for 28 days.

14. The method of claim 11 wherein said raw fly ash has a carbon content of about 0.1 to 4% by weight.

15. A method for producing a mineral filler and pozzolan product from fly ash comprising the steps of:
   providing a quantity of fly ash having a carbon content of about 0.1 to 40% by weight;
   passing said fly ash through an air classifier to obtain from about 35 to 95% by weight of a coarse fraction and from about 5 to 65% by weight of a fine fraction;
   passing said fine fraction through a magnetic separator to obtain said mineral filler; and
   passing said coarse fraction through a 100 mesh screen to obtain said pozzolan product.

* * * * *